United States Patent [19]

Okino

[11] Patent Number: 4,610,236

[45] Date of Patent: Sep. 9, 1986

[54] FUEL SUPPLY CONTROL FOR A DUAL INDUCTION TYPE ENGINE INTAKE SYSTEM

[75] Inventor: Yoshinori Okino, Hiroshima, Japan

[73] Assignee: Mazda Motor Corporation, Hiroshima, Japan

[21] Appl. No.: 612,858

[22] Filed: May 22, 1984

[30] Foreign Application Priority Data

May 24, 1983 [JP] Japan .................................. 58-91924

[51] Int. Cl.⁴ .......................................... F02M 51/00
[52] U.S. Cl. .................................... 123/585; 123/489; 123/492
[58] Field of Search ............... 123/585, 586, 587, 588, 123/589, 489, 480, 492

[56] References Cited

U.S. PATENT DOCUMENTS

| | | | |
|---|---|---|---|
| 4,445,483 | 5/1984 | Hasegawa | 123/489 |
| 4,471,742 | 9/1984 | Kishi | 123/480 |

FOREIGN PATENT DOCUMENTS

| | | | |
|---|---|---|---|
| 53-43616 | 11/1978 | Japan | 123/585 |
| 52152552 | 7/1979 | Japan | 123/585 |
| 0156920 | 12/1979 | Japan | 123/585 |
| 0005473 | 1/1980 | Japan | 123/585 |
| 0206744 | 12/1982 | Japan | 123/585 |
| 2C05348 | 4/1979 | United Kingdom | 123/492 |

*Primary Examiner*—Carl Stuart Miller
*Attorney, Agent, or Firm*—Fleit, Jacobson, Cohn & Price

[57] ABSTRACT

An intake system for an internal combustion engine has a primary intake passage and a secondary intake passage both leading to a combustion chamber and respectively having a primary fuel injecting valve and a secondary fuel injecting valve. A control valve is provided in the secondary intake passage for closing the same under light load engine operation and opening the same under heavy load engine operation so that the intake mixture is introduced into the combustion chamber only through the primary intake passage under light load engine operation and through both the primary and secondary intake passages under heavy load operation. A control unit is provided for operating the primary and secondary fuel injecting valves in accordance with the engine operating condition so that fuel is injected only through the primary fuel injecting valve under light load operation. The control unit functions to decrease the quantity of fuel supply for a predetermined time period when it is detected that the fuel supply through the secondary fuel injecting valve is interrupted to thereby prevent the mixture from being momentarily enriched.

17 Claims, 8 Drawing Figures

FUEL SUPPLY CONTROL FOR A DUAL INDUCTION TYPE ENGINE INTAKE SYSTEM

The present invention relates to a fuel supply control system for internal combustion engines, and more particularly, to a fuel supply control system for engines having dual induction systems.

In an internal combustion engine, it has been known to provide an intake system comprising a primary intake passage of a relatively small effective cross-sectional area and a secondary intake passage of a relatively large effective cross-sectional area both leading to a combustion chamber, with a control valve device which opens the secondary intake passage under heavy load engine operation, so that the intake gas is introduced into the combustion chamber only through the primary intake passage under light load engine operation but through both of the primary and secondary intake passages under the heavy load operation. With this arrangement, it is possible to maintain an adequate speed of the intake gas flow to enhance atomization of fuel even under light load operation and to obtain a satisfactory quantity of intake gas flow for heavy load operation. An example of an intake system of this type is disclosed by Japanese patent application No. 52-152552 filed on Dec. 19, 1977 and disclosed for public inspection on July 4, 1979 under the disclosure No. 54-84128.

In this type of intake system, it is advisable in respect of atomization of fuel and uniform mixing of fuel with air to supply fuel not only to the primary intake passage but also to the secondary intake passage under heavy load operation. It has however been found that with this fuel control a rich air-fuel mixture is temporarily produced when the engine load is decreased so that the fuel supply to the secondary intake passage is interrupted. This is understood as being caused by the fact that there exists a film flow of liquid fuel along the wall surface of the secondary intake passage under heavy load operation wherein the fuel is supplied to both the primary and secondary intake passages, and the liquid fuel is allowed to enter the combustion chamber in the existing form or by being vaporized even after the fuel supply to the secondary intake passage is terminated. Such enrichment of the mixture has bad influences on driveability and noxious emissions.

It is therefore an object of the present invention to provide a fuel control system for internal combustion engines in which the aforementioned enrichment of the air-fuel mixture can be avoided.

Another object of the present invention is to provide an engine fuel control system which can maintain the air-fuel ratio of the intake mixture substantially unchanged when the fuel supply to the secondary intake passage is interrupted.

A further object of the present invention is to provide a dual induction type intake system having a fuel control system which can prevent enrichment of the air-fuel mixture when the fuel supply to the secondary intake passage is interrupted due to a decrease in the engine load.

According to the present invention, the above and other objects can be accomplished by an intake system for an internal combustion engine which comprises primary intake passage means and secondary intake passage means both leading to combustion chamber means, control valve means for closing the secondary intake passage means under light load engine operation but opening the secondary intake passage means under heavy load engine operation so that intake gas is introduced into the combustion chamber means only through the primary intake passage means under light load engine operation but through both the primary and secondary intake passage means under heavy load operation, fuel supply means for supplying metered quantity of fuel to said primary and secondary intake passage means, fuel supply compensating means for decreasing the quantity of fuel supplied to a quantity below the quantity required for an actual engine operating condition for a predetermined time when it is detected that fuel supply through the secondary intake passage means is terminated.

In a preferable aspect of the present invention, the fuel supply means includes primary fuel injection means for injecting fuel to the primary intake passage means and secondary fuel injection means for injecting fuel to the secondary intake passage means, said secondary fuel injecting means being operated only under heavy load operation. Means may also be provided for increasing the quantity of fuel supplied to a quantity greater than the quantity required for an actual engine operating condition for a predetermined time when it is detected that fuel supply to the secondary intake passage means is started.

The above and other objects and features of the present invention will become apparent from the following descriptions of preferred embodiments taking reference to the accompanying drawings, in which.

Figure 1:
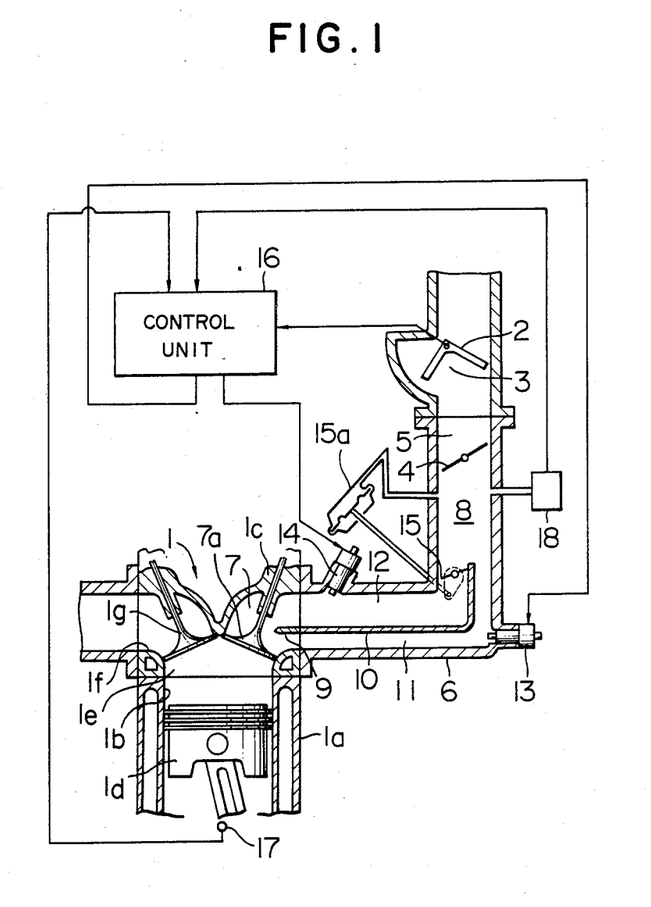
FIG. 1 is a diagrammatical sectional view of an engine intake system in accordance with one embodiment of the present invention.

Referring now to the drawings, particularly to FIG. 1, there is shown an internal combustion engine 1 having a cylinder block 1a formed with a cylinder bore 1b, a cylinder head 1c attached to the cylinder block 1a and a piston 1d disposed in the cylinder bore 1b for reciprocating movements. A combustion chamber 1e is thus defined by the cylinder block 1a, the cylinder head 1c and the piston 1d. The cylinder head 1c is formed with an exhaust port 1f which is associated with an exhaust valve 1g. There is also formed in the cylinder head 1c an intake port 7 which is associated with an intake valve 7a. Leading to the intake port 7 is an intake passage 8 which is comprised of an airflow chamber 3 provided with an airflow meter 2, a throttle valve chamber 5 provided with a throttle valve 4, and an intake manifold 6. In the intake port 7, there is formed a partition wall 9 and the intake passage 8 is provided at the downstream part with a partition wall 10 contiguous with the partition wall 9 in the intake port 7. Thus, the partition walls 9 and 10 divide the upstream part of the intake port 7 and the downstream part of the intake passage 8 into a primary passage 11 and a secondary passage 12. As well known in the art, the primary passage 11 has a relatively small cross-sectional area and the secondary passage 12 has a relatively large cross-sectional area.

In the primary intake passage 11, there is a primary fuel injection valve 13 for supplying a metered quantity of fuel to the passage 11. Similarly, the secondary intake passage 12 is provided with a secondary fuel injection valve 14 for supplying a metered quantity of fuel to the passage 12. Further, the secondary intake passage 12 is provided at the upstream end portion with an auxiliary throttle valve 15 which is actuated by a pneumatically operated actuator 15a. The actuator 15a is operated under the intake suction pressure downstream of the throttle valve 4 to move the auxiliary valve 15 to the closed position under light load engine operation so that the intake air is drawn only through the primary intake passage 11, and to the open position under heavy load engine operation so that the intake air is drawn through both the primary and secondary intake passages 11 and 12. In the illustrated embodiment, the primary fuel injection valve 13 is located at the upstream portion of the primary intake passage 11. This is advantageous in obtaining an improved fuel atomization and a uniform mixing of fuel with air. Further, the secondary fuel injection valve 14 is located at the downstream portion of the secondary intake passage 12 so that the fuel injected through the secondary valve 14 is rapidly drawn into the combustion chamber 1e to thereby improve the response characteristics of the engine under heavy load operation.

In order to control the quantity of fuel supplied to the engine, there is provided a control unit 16 which may be comprised of a microprocesor. The engine 1 is provided, in addition to the airflow meter 2, with an engine speed meter 17 and a suction pressure sensor 18, and the control unit 16 receives an intake airflow signal from the airflow meter 2, an engine speed signal from the speedmeter 17 and an engine load signal from the suction pressure sensor 18. The control unit 16 performs an operation to calculate the quantities of fuel to be discharged respectively through the injection valves 13 and 14. The injection valves 13 and 14 are of the duty factor solenoid type, wherein the quantity of fuel is determined by the duration of an input pulse in a unit time.

Figures 2, 2A:
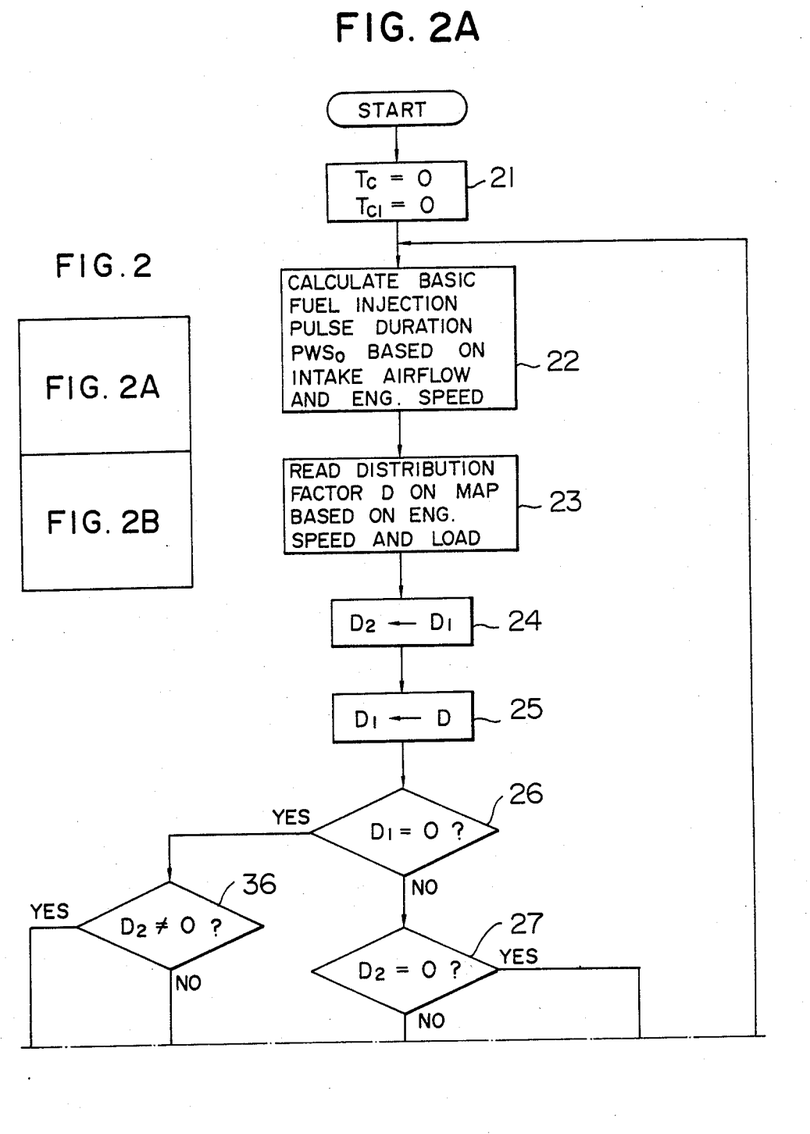
FIGS. 2, 2A and 2B indicate flow charts showing the operation of the fuel supply control circuit adopted in the intake system shown in FIG. 1.
Figure 2B:
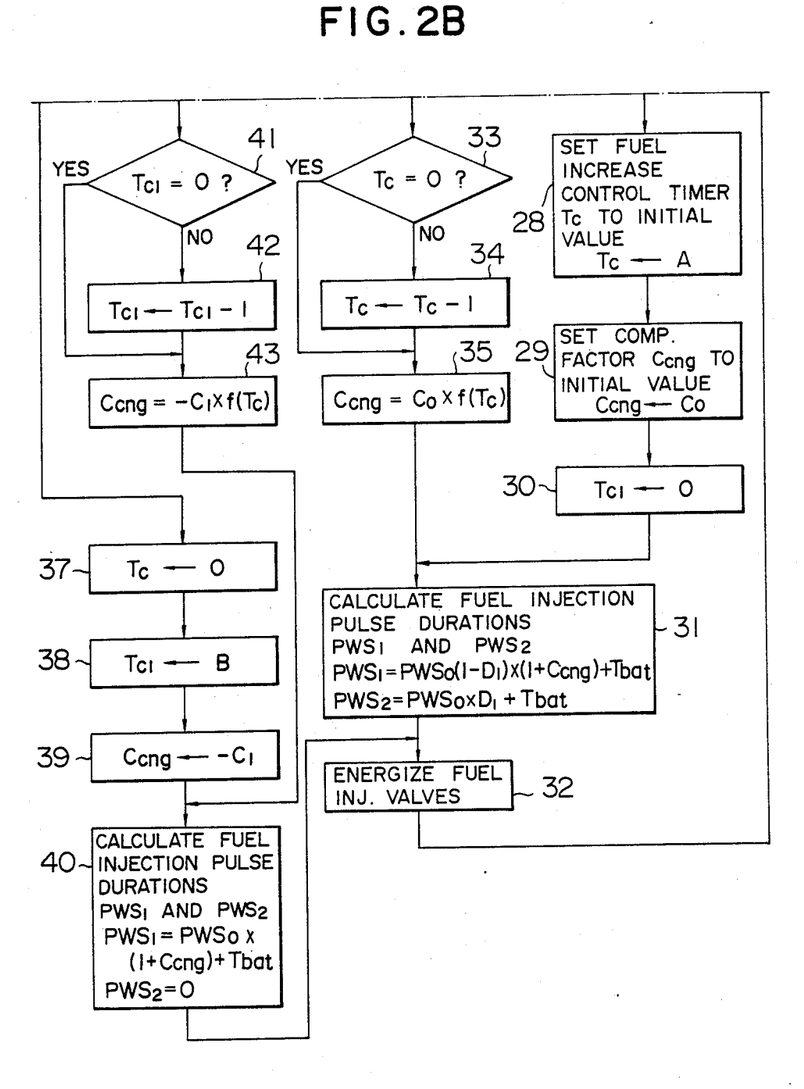
Figure 3:
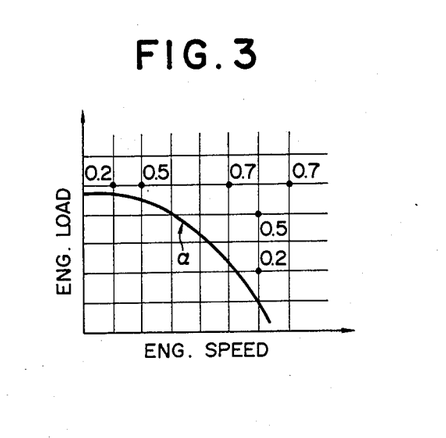
FIG. 3 shows one example of the map for determining fuel distribution factor in accordance with the engine load and the engine speed.

The operation of the control unit 16 will now be described with reference to FIG. 2. At first, the timers $T_c$ and $T_{cl}$ are set to zero at the step 21 and then the basic fuel injection pulse width PWSo is calculated in the step 22 based on the intake airflow signal and the engine speed signal. In a succeeding step 23, a distribution factor D is determined based on the engine speed signal and the engine load signal. For that purpose, the control unit has a memory map which, as shown in FIG. 3, contains various values of distribution factor in accordance with the engine load and the engine speed. The control unit 16 reads an appropriate one of the memorized values of distribution factor D in the map. The distribution factor D is used to determine the share of the fuel provided by the secondary fuel injection valve 14. In the map shown in FIG. 3, the distribution factor D is zero in the area below the line α so that the total quantity of fuel is injected through the primary valve 13 when the engine operating condition falls in this area.

In the step 24, the distribution factor $D_1$ which has been stored in the previous cycle is shifted to $D_2$ and the distribution factor D as obtained in the step 23 is stored as the factor $D_1$ in the step 25. Then, a judgement is made in the step 26 as to whether the factor $D_1$ is zero. If the answer is NO, a further judgement is made in the step 27 as to whether the factor $D_2$ is zero. If the answer is YES, it is judged that the engine operating condition has just been changed to require fuel injection not only through the primary valve 13 but also through the secondary valve 14. Then, an initial value A is set in the fuel increase control timer $T_c$ in the step 28 and an initial value $C_o$ for fuel increase is set in the fuel compensation factor $C_{cng}$ in the step 29. Thereafter, the fuel reduction control timer $T_{cl}$ is set to zero in the step 30 and then the step 31 is carried out.

In the step 31, fuel injection pulse durations $PWS_1$ and $PWS_2$ are calculated respectively for the primary and secondary valves 13 and 14 in accordance with the following formulae:

$$PWS_1 = PWS_o(1-D_1) \cdot (1+C_{cng}) + T_{bat}$$

$$PWS_2 = PWS_o \cdot D_1 + T_{bat}$$

wherein $T_{bat}$ is a factor compensating for the delay of initiation of fuel injection, due for example to inertia of the valve mechanism after an application of the energizing pulse to the valve. The pulse of the calculated durations are applied to the valves 13 and 14 in the step 32 to effect required fuel injection.

If the judgement in the step 27 is NO, a further judgement is made in the step 33 as to whether the timer $T_c$ is zero. If the judgement is NO, the count value of the timer $T_c$ is subtracted by one in the step 34 and the compensation factor $C_{cng}$ is calculated in the step 35 in accordance with the following formula:

$$C_{cng} = C_o \cdot f(T_c)$$

Figure 4:
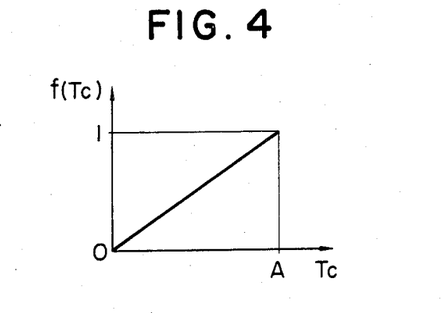
FIG. 4 is a chart for determining a fuel flow reduction factor.

As shown in FIG. 4, the value f(Tc) decreases in response to a decrease in the count value of the timer Tc so that the compensation factor $C_{cng}$ as calculated in the step 35 is smaller than the factor as initially determined in the step 29. It will further be understood that the compensation factor $C_{cng}$ decreases and finally becomes zero as the timer passes after the engine operating condition is changed to require fuel injection through the secondary fuel injection valve 14. This means that, when the engine operating condition is changed and the secondary fuel injection valve 14 is started to be energized, the quantity of fuel supply is increased for a time period A by a value which is determined by the function f(Tc) shown in FIG. 4. This momentary increase in the fuel supply is advisable in maintaining a desired air-fuel ratio because, at the initial period of fuel injection through the secondary fuel injection valve 14, a part of the fuel may not be drawn into the combustion chamber immediately but may be deposited on the wall of the secondary intake passage 12 to form a liquid film flow so that there is a possibility that a lean mixture is temporarily produced in this period.

If the judgement in the step 26 is YES to indicate that the distribution factor $D_1$ is zero, a further judgement is made in the step 36 as to whether the factor $D_2$ is not zero. If the answer is YES indicating that the distribution factor D was not zero in the previous cycle, the fuel increase control timer Tc is set to zero in the step 37 and an initial value B is set in the fuel reduction control timer $T_{cl}$ in the step 38. Then, a negative value $-C_1$ is set in the compensation factor $C_{cng}$ in the step 39. Thereafter, a calculation is made in the step 40 to obtain the fuel injection pulse durations $PWS_1$ and $PWS_2$ in accordance with the following formulae:

$$PWS_1 = PWS_o \cdot (1 + C_{cng}) + T_{bat}$$

$$PWS_2 = 0$$

With the results of the calculation, the primary fuel injection valve 13 is energized.

If the judgement in the step 36 is NO indicating that the distribution factor D was zero in the previous cycle, a further judgement is made in the step 41 as to whether the count value in the timer $Tc_1$ is zero. If the answer is NO, the count in the timer $Tc_1$ is subtracted by one in the step 42 and a compensation factor $C_{cng}$ is calculated in the step 43 in accordance with the following formula:

$$C_{cng} = -C_1 \cdot f(Tc_1)$$

Figure 5:
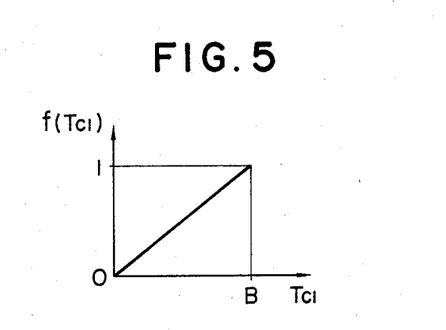
FIG. 5 is a chart for determining a fuel flow increase factor.

As shown in FIG. 5, the value $f(Tc_1)$ decreases in response to a decrease in the count value of the timer $Tc_1$. When the judgement in the step 41 is YES indicating that the count of the timer $Tc_1$ is zero, the step 43 is carried out to calculate the compensation factor $C_{cng}$ which is zero in this case. It will be understood that, in this control, when the engine operating condition is changed so that the fuel supply through the secondary fuel injection valve 14 is terminated, the fuel supply is temporarily decreased for a timer period B by a value as determined by the compensation factor $C_{cng}$ which decreases as time passes. This is effective to prevent the air-fuel mixture to the combustion chamber 1e to be momentarily enriched when the fuel supply through the secondary fuel injection valve 14 is terminated.

Figure 6:
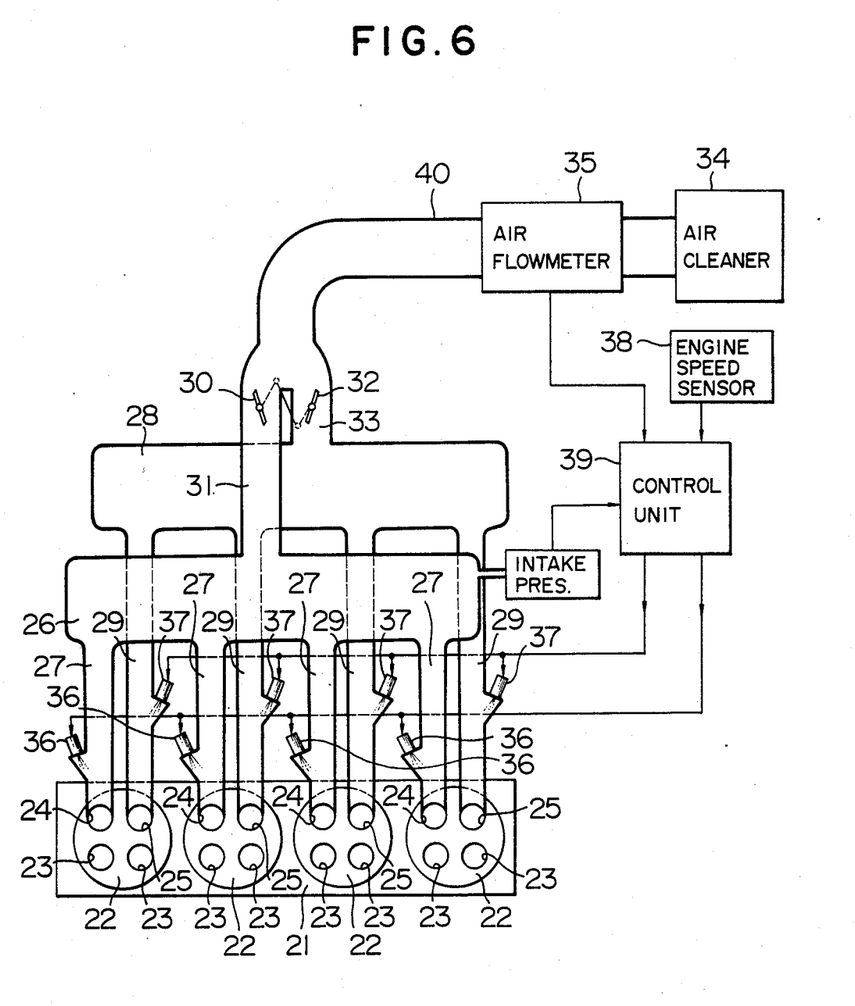
FIG. 6 is a diagrammatical view of an engine intake system in accordance with another embodiment of the present invention.

FIG. 6 shows another four-cylindered engine. Each of four combustion chambers 22 formed in a cylinder block 21 is formed with two exhaust ports 23, a primary intake port 24 and a secondary intake port 25. There are provided primary intake branch passages 27 which are connected with the primary intake ports 24. The branch passages 27 are branched from an inlet manifold pipe 26 which functions as a primary surge tank. There are further provided secondary intake branch passages 29 which are connected with the secondary intake ports 25. The secondary intake branch passages 29 are branched from an intake manifold pipe 28 which functions as a secondary surge tank. The primary intake branch passages 27 are connected with a primary intake passage 31 having a primary throttle valve 30 through the manifold pipe 26. The secondary intake branch passages 27 are connected with a secondary intake passage 33 having a secondary throttle valve 32 through the manifold pipe 28. Furthermore, the intake passages 31, 33 are connected with a main intake passage 40 provided with an air cleaner 34 and an airflow meter 35. The secondary throttle valve 32 begins to open when the primary throttle valve 30 is substantially fully opened, so as to permit the intake air for heavy load engine operation to pass through the secondary intake passage 33.

The primary intake branch passages 27 are respectively provided with primary fuel injection valves 36 which are positioned relatively close to the combustion chamber 22. The secondary intake branch passages 29 are respectively provided with secondary fuel injection valves 37 which are located further from the combustion chambers 22 than the first fuel injection valves 36. The engine is provided with an engine speed sensor 38 which senses the rotating speed of the engine. A control unit 39 is connected with the air flowmeter 25 and the engine speed sensor 38 to receive signals therefrom. The control unit 39 may have the same construction and function as the control unit 16 in the previous embodiment. The control unit 39 calculates the amount of fuel to be supplied to the engine in accordance with engine operating conditions on the basis of input signals, and operates the primary and secondary fuel injection valves 36 and 37 in accordance with the calculated results.

The invention has thus been shown and described with reference to specific embodiments, however, it should be noted that the invention is in no way limited to the details of the illustrated arrangements but changes and modifications may be made without departing from the scope of the appended claims.

I claim:

1. An intake system for an internal combustion engine which comprises primary intake passage means and secondary intake passage means both leading to combustion chamber means, control valve means for closing the secondary intake passage means under light load engine operation and for opening the secondary intake passage means under heavy load engine operation so that intake gas is introduced into the combustion chamber means only through the primary intake passage means under light load engine operation but through both the primary and secondary intake passage means under heavy load operation, fuel supply means for supplying a metered quantity of fuel that is required for an actual engine operating condition to said primary intake passage means when the secondary intake passage means is closed by the control valve means and to each of said primary and secondary intake passage means when the secondary intake passage means is opened by the control valve means, fuel supply compensating means for decreasing the metered quantity of fuel supply to the primary intake passage means by a predetermined amount to provide a quantity of fuel that is less than the quantity required for said actual engine operating condition and for a predetermined time when it is detected that the engine operating condition is changed from a heavy load operation condition wherein the fuel is supplied to both the primary and secondary intake passage means to a light load operation condition wherein the fuel is supplied only to the primary intake passage means and the fuel supply to the secondary intake passage means is terminated.

2. An intake system for an internal combustion engine which comprises primary intake passage means and secondary intake passage means both leading to combustion chamber means, control valve means for closing the secondary intake passage means under light load engine operation and for opening the secondary intake passage means under heavy load engine operation so that intake gas is introduced into the combustion chamber means only through the primary intake passage means under light load engine operation but through both the primary and secondary intake passage means under heavy load operation, fuel supply means for supplying a metered quantity of fuel to said primary intake passage means when the secondary intake passage means is closed by the control valve means and to each of said primary and secondary intake passage means when the secondary intake passage means is opened by the control valve means, fuel supply compensating means for decreasing the metered quantity of fuel supply to the primary intake passage means by a predetermined amount to provide a quantity of fuel that is less than the quantity required for an actual light load engine operation condition and for a predetermined time when it is detected that the fuel supply to the secondary intake passage means is terminated, said compensating means including means for gradually decreasing the amount of decrease in the fuel supply.

3. An intake system for an internal combustion engine which comprises primary intake passage means and secondary intake passage means both leading to combustion chamber means, control valve means for closing the secondary intake passage means under light load engine operation and for opening the secondary intake passage means under heavy load engine operation so that intake gas is introduced into the combustion chamber means only through the primary intake passage means under light load engine operation but through both the primary and secondary intake passage means under heavy load operation, fuel supply means for supplying a metered quantity of fuel to said primary intake passage means when the secondary intake passage means is closed by the control valve means and to each of said primary and secondary intake passage means when the secondary intake passage means is opened by the control valve means, fuel supply compensating means for decreasing the metered quantity of fuel supply to the primary intake passage means by a predetermined amount to provide a quantity of fuel that is less than the quantity required for an actual light load engine operation condition and for a predetermined time when it is detected that the fuel supply to the secondary intake passage means is terminated, and said compensating means including means for decreasing the amount of decrease in the fuel supply as time passes.

4. An intake system for an internal combustion engine which comprises primary intake passage means and secondary intake passage means both leading to combustion chamber means, control valve means for closing the secondary intake passage means under light load engine operation and for opening the secondary intake passage means under heavy load engine operation so that intake gas is introduced into the combustion chamber means only through the primary intake passage means under light load engine operation but through both the primary and secondary intake passage means under heavy load operation, fuel supply means for supplying a metered quantity of fuel to said primary intake passage means when the secondary intake passage means is closed by the control valve means and to each of said primary and secondary intake passage means when the secondary intake passage means is opened by the control valve means, fuel supply compensating means for decreasing the metered quantity of fuel supply to the primary intake passage means by a predetermined amount to provide a quantity of fuel that is less than the quantity required for an actual light load engine operation condition and for a predetermined time when it is detected that the fuel supply to the secondary intake passage means is terminated, said compensating means including means for gradually decreasing the amount of decrease in the fuel supply, and in which said compensating means includes timer means and means for providing an initial compensating value and determining a compensating factor based on said initial compensating value and a timer count of said timer means for determining the amount of decrease in the fuel supply.

5. An intake system in accordance with claim 1 in which said fuel supply means includes a fuel injection valve means.

6. An intake system in accordance with claim 1 in which said fuel supply means includes primary fuel injection valve means provided for injecting fuel to said primary intake passage means and secondary fuel injection valve means provided for injecting fuel to said secondary intake passage means, and control means for supplying fuel only through said primary fuel injection valve means under light load engine operation and through both said primary and secondary fuel injection valve means under heavy load engine operation.

7. An intake system in accordance with claim 6 in which said primary fuel injection valve means is located further from the combustion chamber means than the secondary fuel injection valve means.

8. An intake system in accordance with claim 6 in which said compensating means includes means for detecting interruption of fuel supply through the secondary fuel injection valve means.

9. An intake system in accordance with claim 6 in which said control means includes map means for determining a fuel distribution factor for distributing fuel between said primary and secondary fuel injection valve means in accordance with an engine operating condition.

10. An intake system in accordance with claim 9 in which said control means includes means for detecting the interruption of the fuel supply through the secondary fuel injection valve means from the fuel distribution factor.

11. An intake system in accordance with claim 1 in which said compensating means includes means for increasing the quantity of fuel supply to a value greater than the quantity required for an actual engine operating condition for a predetermined time when it is detected that fuel supply to the secondary intake passage means is started.

12. An intake system in accordance with claim 11 in which said fuel supply increasing means includes means for gradually decreasing the amount of increase in the fuel supply.

13. An intake system in accordance with claim 1 in which said primary and secondary intake passage means are communicated through common intake port means with the combustion chamber means.

14. An intake system in accordance with claim 1 in which said primary and secondary intake passage means are communicated with the combustion chamber means respectively through primary and secondary intake port means which are separated from each other.

15. An intake system in accordance with claim 1 in which said primary and secondary intake passage means are connected with common main passage means which is provided with throttle valve means.

16. An intake system in accordance with claim 1 in which said primary intake passage means is provided with throttle valve means.

17. An intake system for an internal combustion engine which comprises primary intake passage means and secondary intake passage means both leading to combustion chamber means, control valve means for closing the secondary intake passage means under light load engine operation and for opening the secondary intake passage means under heavy load engine operation so that intake gas is introduced into the combustion chamber means only through the primary intake passage means under light load engine operation but through both the primary and secondary intake passage means under heavy load operation, primary fuel injecting valve means provided in said primary intake passage means for injecting fuel into said primary intake passage means, secondary fuel injecting valve means provided in said secondary intake passage means for injecting fuel into said secondary intake passage means, engine operating condition detecting means for producing an output representing an actual engine operating condition, control means responsive to said output of the engine operating condition detecting means for producing signals for operating said primary fuel injecting valve means under light load engine operation and for operating said primary and secondary fuel injecting valve means under heavy load engine operation so that fuel is injected only into the primary intake passage means under light load engine operation and into each of the primary and secondary intake passage means under heavy load engine operation, said control means including means for modifying said signals so that the quantity of fuel supplied through the primary fuel injecting valve means is decreased for a predetermined time to a quantity less than the quantity required for said actual engine operating condition when it is detected that the engine operating condition is changed from a heavy load engine operation condition wherein both the primary and secondary fuel injecting valve means are operated to a light load engine operation condition wherein only the primary fuel injecting valve means is operated and the fuel supply through the secondary fuel injecting valve means is interrupted.

* * * * *